(12) United States Patent
Cooksey et al.

(10) Patent No.: US 7,670,076 B2
(45) Date of Patent: Mar. 2, 2010

(54) MULTI-SIDED SHAFT TAPERED LOCKING HUB APPARATUS

(75) Inventors: William L. Cooksey, Geneseo, IL (US); Neal R. Rosengren, Geneseo, IL (US); Kirk P. Hillard, Bettendorf, IA (US)

(73) Assignee: CNH America LLC, New Holland, PA (US)

( * ) Notice: Subject to any disclaimer, the term of this patent is extended or adjusted under 35 U.S.C. 154(b) by 177 days.

(21) Appl. No.: 12/072,462

(22) Filed: Feb. 26, 2008

(65) Prior Publication Data

US 2009/0214290 A1 Aug. 27, 2009

(51) Int. Cl.
*F16D 1/09* (2006.01)

(52) U.S. Cl. .................. 403/16; 403/370; 403/371; 403/374.4; 403/383

(58) Field of Classification Search .......... 403/11, 403/16, 355, 368, 370, 371, 374.3, 374.4, 403/383; 464/901
See application file for complete search history.

(56) References Cited

U.S. PATENT DOCUMENTS

| | | | | |
|---|---|---|---|---|
| 774,870 | A * | 11/1904 | Ferrall | 403/11 |
| 2,402,743 | A | 6/1946 | Firth | 287/52 |
| 2,482,662 | A * | 9/1949 | Dunne | 403/16 |
| 2,509,711 | A | 5/1950 | Williams | 287/52 |
| 2,514,675 | A * | 7/1950 | Shafter | 403/367 |
| 2,519,958 | A | 8/1950 | Firth | 287/52.06 |
| 2,691,541 | A | 10/1954 | Benedek | 287/52.06 |
| 2,763,158 | A | 9/1956 | Firth | 74/230.3 |
| 3,023,035 | A * | 2/1962 | Kelley | 403/16 |
| 3,368,833 | A | 2/1968 | Chung | 287/52.06 |
| 3,851,977 | A | 12/1974 | Boole | 403/16 |
| 4,494,889 | A | 1/1985 | Thompson | 403/4 |
| 4,512,681 | A | 4/1985 | Hayhurst et al. | 403/371 |
| 4,615,532 | A | 10/1986 | Biller et al. | 279/32 |
| 5,174,680 | A | 12/1992 | Nakamura et al. | 403/370 |
| 5,810,504 | A * | 9/1998 | Rabinovich | 403/371 |
| 6,332,734 | B1 | 12/2001 | Hebert | 403/371 |

(Continued)

FOREIGN PATENT DOCUMENTS

WO 9846897 10/1998

*Primary Examiner*—Michael P Ferguson
(74) *Attorney, Agent, or Firm*—Michael G. Harms; John William Stader; Patrick M. Sheldrake

(57) ABSTRACT

A multi-sided shaft and locking hub apparatus, wherein the locking hub includes an inner hub having a multi-sided inner surface extending around a center hole for receiving the shaft for preventing rotation therebetween, the inner hub including a tapered outer surface, and being cut through, and an outer hub having a tapered inner surface defining a central hole for receiving the inner hub such that the tapered surfaces abut, the outer hub including a multi-sided inner surface defining an extension of the center hole therethrough for receiving the multi-sided shaft with the sides of the inner surface of the outer hub in non-rotating relation, and the tapered surfaces including opposing inner and outer half-holes at spaced locations therearound, for cooperatively receiving threaded members, outer half-holes at some of the spaced locations being threaded so as to be threadedly engageable with the threaded members for pressing the inner and outer hubs together while compressing the inner hub, and the inner half-holes at others of the spaced locations being threadedly engageable with the threaded members for jacking the inner and outer hubs apart.

15 Claims, 4 Drawing Sheets

U.S. PATENT DOCUMENTS 6,568,063 B1   5/2003  Sweeney et al. ......... 29/525.01
6,712,544 B2 * 3/2004  Kruger et al. ............... 403/370
2009/0087258 A1 * 4/2009 McCabe ..................... 403/370

* cited by examiner

MULTI-SIDED SHAFT TAPERED LOCKING HUB APPARATUS

TECHNICAL FIELD

This invention relates generally to apparatus for mounting a hub on a multi-sided shaft, such as, but not limited to, a hex shaft, and more particularly, to a combination of a multi-sided shaft and tapered locking hub apparatus which enables fixedly and precisely releasably locking a hub to the shaft, and which provides a substantial power transmitting capability.

BACKGROUND ART

Multi-sided shafts are commonly used for power transmission applications for which round, keyed shafts provide inadequate power transmission capabilities. Sometimes, apparatus such as and overrunning clutch will be utilized with a multi-sided shaft to avoid shaft breakage and other problems which can occur, for instance, when overpowered, or movement of the driven portion of the apparatus is prevented, or reduced relative to the driving element. A representative application is an agricultural combine harvester wherein power is to be transferred from the engine of the harvester to a large power consuming subsystem or subsystems, such as conveyors, and/or the header and infeed subsystems.

A variety of releasable, tapered locking hub constructions are known. Reference in this regard Firth U.S. Pat. Nos. 2,402,743 issued Jun. 25, 1946; 2,519,958 issued Aug. 22, 1950; and 2,763,158 issued Sep. 18, 1956. These known locking hubs generally include a split inner hub having a round bore therethrough that fits around a round shaft, and a tapered outer surface. The locking hubs also have an outer hub having a tapered inner surface defining a center bore that receives the inner hub, such that the tapered inner and outer surfaces can be matingly engaged, to compress the inner hub around the shaft for holding the locking hub in position on the shaft. The outer and inner hubs also include half-holes or bores at spaced locations around the tapered inner and outer surfaces, outer sides of some of the bores being threaded so as to be threadedly engageable by a screw inserted in the bore for moving the inner and outer hubs into engagement, and inner sides of others of the bores being threaded for jacking the outer and inner hubs apart. This has been found to be a useful feature, and would be desirable for use with higher power transmitting applications, such as multi-sided shafts used in the above applications.

Accordingly, what is sought is a releasable locking hub configuration adaptable for use with multi-sided shafts, and power transmission levels typically transmitted thereby.

SUMMARY OF THE INVENTION

What is disclosed is a releasable locking hub configuration adaptable for use with high power transmission, multi-sided shaft applications.

According to preferred aspect of the invention, the multi-sided shaft and locking hub apparatus includes a locking hub including an inner hub having a multi-sided inner surface extending around and defining a center hole through the inner hub configured and sized for receiving the multi-sided shaft with the sides of the inner surface in face-to-face abutting relation with the sides of the shaft. The inner hub includes a tapered outer surface extending therearound, and a slot or cut extending completely through the inner hub between the tapered outer surface and the multi-sided inner surface, facilitating radially compressing the inner hub. The locking hub includes an outer hub having a tapered inner surface extending around and defining a central hole therethrough adapted for receiving the inner hub with the tapered inner surface and the tapered outer surface in face-to-face abutting relation, or other suitable non-relative rotational engagement. That is, an engagement or relation that will not allow relative rotation of the shaft and inner hub. The outer hub also preferably includes a multi-sided inner surface defining an extension of the center hole therethrough configured and sized for receiving the multi-sided shaft with the sides of the inner surface of the outer hub in face-to-face engagement or other suitable non-rotating relation with the sides of the shaft. The tapered outer surface and the tapered inner surface additionally include inner and outer half-holes at spaced locations therearound, respectively, the inner and outer half-holes at the spaced locations, respectively, being alignable in opposing relation when the inner hub is received in the center hole of the outer hub, for cooperatively receiving threaded members. The outer half-holes at some of the spaced locations are threaded so as to be threadedly engageable with the threaded members when received therein for pressing the inner hub and the outer hub together longitudinally relative to the shaft, while exerting a radially compressive force against the inner hub. And, the inner half-holes at others of the spaced locations are threaded so as to be threadedly engageable with the threaded members when received therein for jacking the inner hub and the outer hub apart.

DETAILED DESCRIPTION OF THE INVENTION

Figure 1:
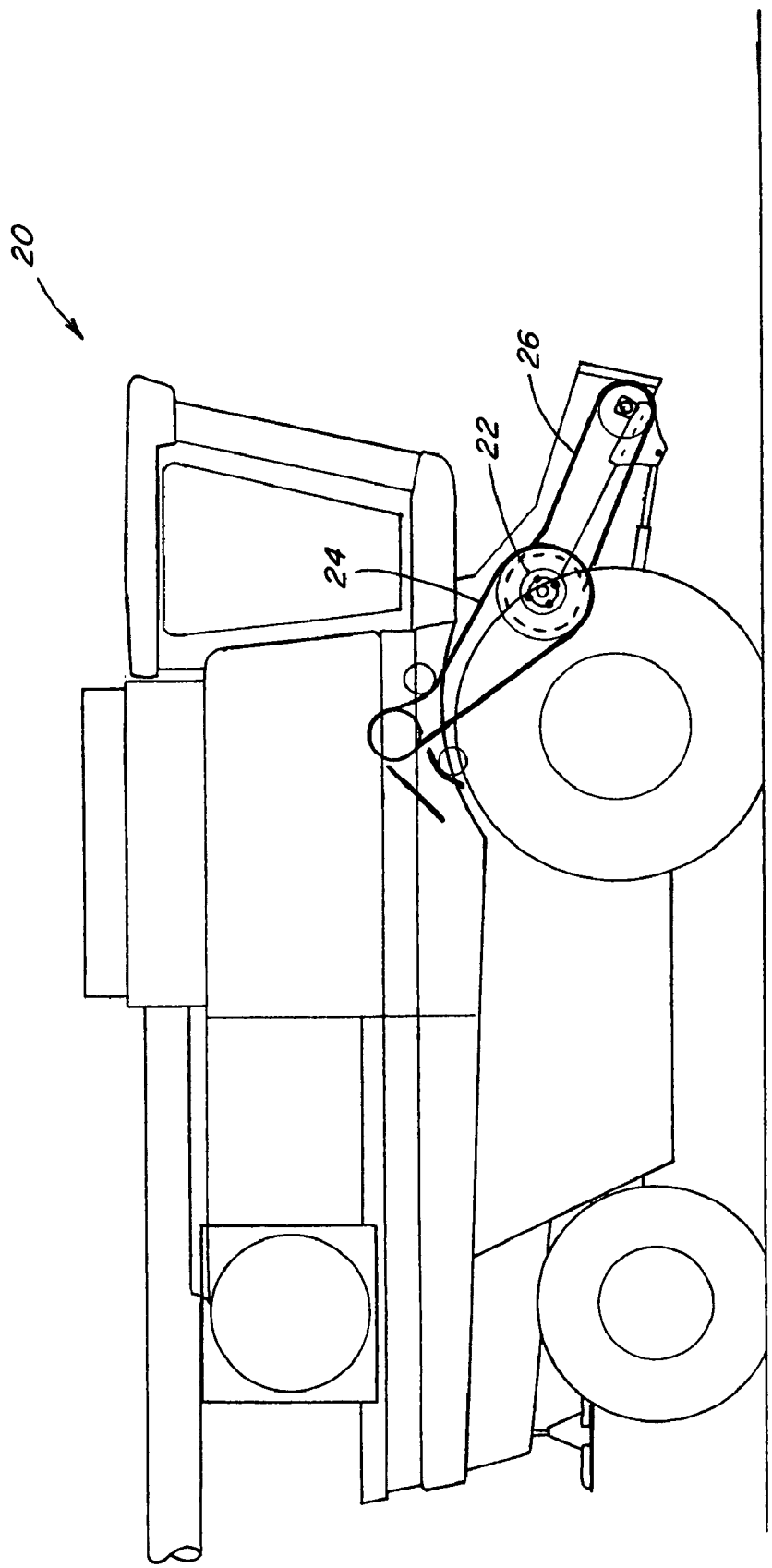
FIG. 1 is a simplified side view of a representative agricultural combine harvester including a multi-sided shaft and locking hub apparatus of the invention.

Turning now to the drawings wherein a preferred embodiment of the invention is shown, in FIG. 1, a conventional, well known agricultural combine harvester 20, is shown. Harvester 20 includes a multi-sided shaft and locking hub apparatus 22 constructed and operable according to the teachings of the invention, connecting a drive belt 24 in rotatably driving relation with a second drive belt 26.

Figure 2:
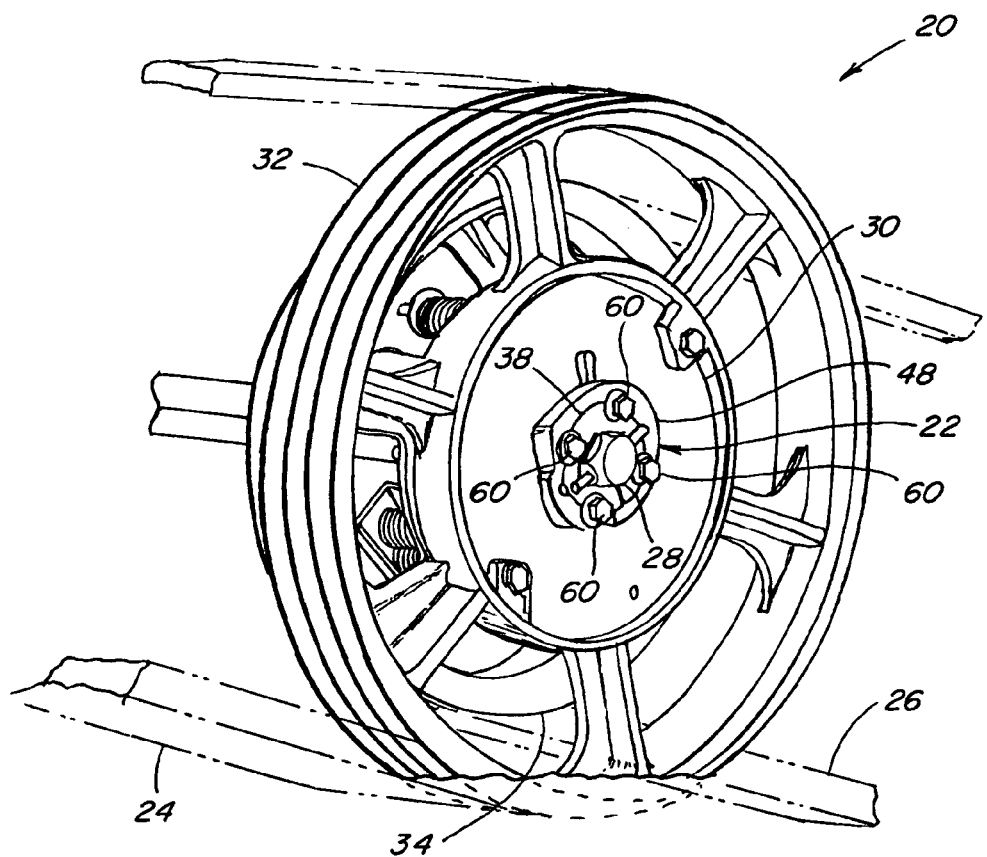
FIG. 2 is an enlarged fragmentary view of the apparatus of the invention.

Referring also to FIG. 2, belts 24 and 26 are intended to be illustrative of a wide variety of applications for apparatus 22, and, here, for instance, belt 24 can be rotated by a suitable power source, such as a power train of harvester 20, so as to rotatably drive belt 26 as well as a multi-sided shaft 28 of apparatus 22. As an alternative, both belts 24 and 26 could be rotated by rotation of multi-sided shaft 28 via a drive mechanism on an opposite end of the shaft (not shown). Here also, apparatus 22 is illustrated as comprising an element of an overrunning clutch 30 which connects a first sheave 32 partially encircled by belt 24 and a second sheave 34 partially encircled by belt 26 with shaft 28. Thus, it should be observed that under normal circumstances, first and second sheaves 32 and 34 will rotate together, along with shaft 28, but when overloaded, clutch 30 will allow rotation of the sheaves relative to the shaft. As a result, if the rotation of shaft 28 is halted or slowed, belts 24 and 26 will be allowed rotate relative to shaft 28, until the overload is removed.

Figure 3:
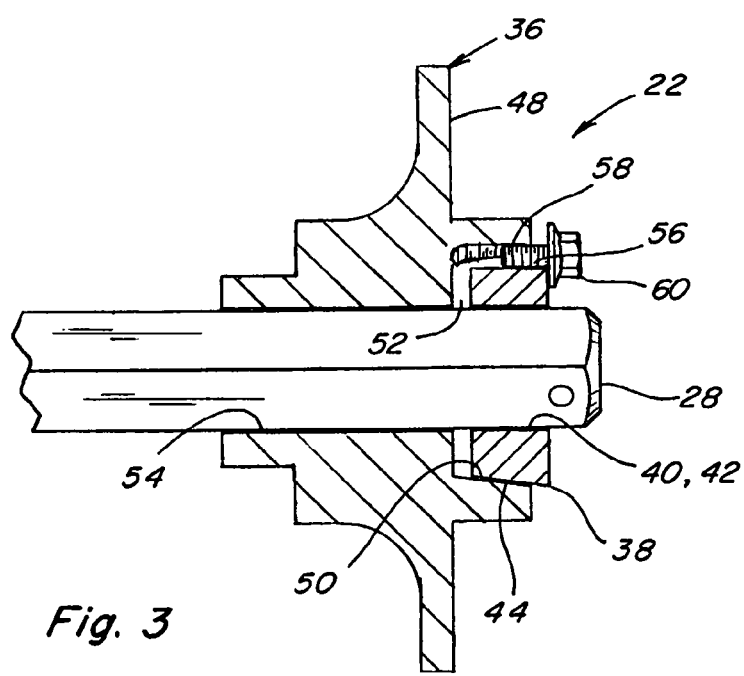
FIG. 3 is a simplified sectional view of the apparatus.
Figure 4:
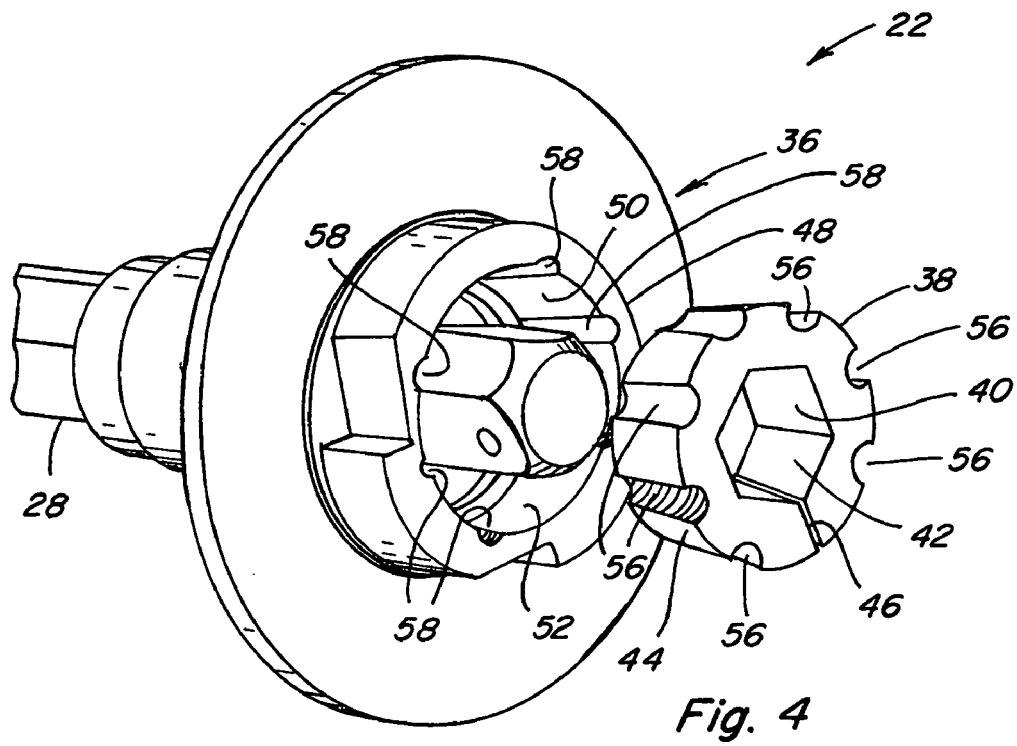
FIG. 4 is a simplified exploded perspective view of elements of the apparatus.
Figure 5:
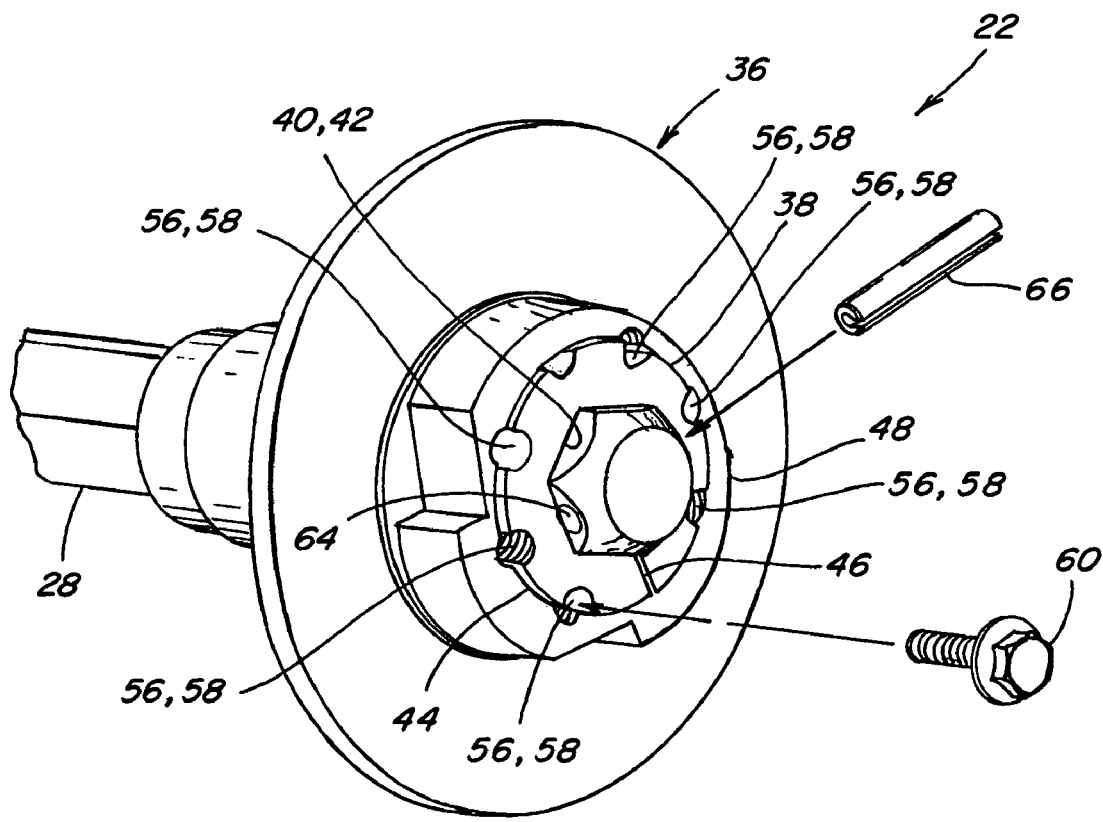
FIG. 5 is another perspective view of the apparatus, illustrating insertion of certain elements thereof into other elements thereof.

Referring also to FIGS. 3, 4 and 5, apparatus 22 includes a multi-sided shaft 28, which here, is a hexagonal shaft, although other number sided shafts, such as square or octagonal, could be used with the apparatus of the invention. Apparatus 22 also includes a locking hub 36, including an inner hub 38 having a multi-sided inner surface 40 extending around and defining a center hole 42 through inner hub 38 configured and sized preferably with the same or a mating number of sides as multisided shaft 28, so as to be capable of receiving shaft 28 with the sides of inner surface 40 in face-to-face abutting or other non-relative rotating or mating relation with the sides of the shaft. Inner hub 38 includes a tapered outer surface 44 extending therearound, and a cut 46 extending therethrough to enable compressing inner hub 38. Locking hub 36 additionally includes an outer hub 48 having a tapered inner surface 50 extending around and defining a central hole 52 therethrough adapted for receiving inner hub 38 with tapered inner surface 50 and tapered outer surface 44 in face-to-face abutting relation, outer hub 48 including a multi-sided inner surface 54 (FIG. 3) defining a smaller but multi-sided extension of center hole 52 therethrough, configured and sized for receiving multi-sided shaft 28 with the sides of inner surface 54 preferably in non-relative rotating relation, or other potentially power transmitting relation with the sides of shaft 28. Thus, when inner hub 38 is disposed in center hole 52 of outer hub 48, the multi-sided surfaces of both inner hub 38 and outer hub 48 will be in face-to-face relation with the corresponding surfaces of shaft 28. This is advantageous, as it provides additional area of surface contact for transmitting power between apparatus 22 and shaft 28, some of which power can be transmitted directly between shaft 28 and outer hub 48, such that all of the power does not need to be transmitted solely through inner hub 38.

To enable tightly installing inner hub 38 in center hole 52 of outer hub 48, tapered outer surface 44 and tapered inner surface 50 include a plurality of inner and outer half-holes 56 and 58, respectively, disposed at spaced locations therearound, respectively, and alignable when inner hub 38 is received in center hole 52 of outer hub 48.

Figure 6:
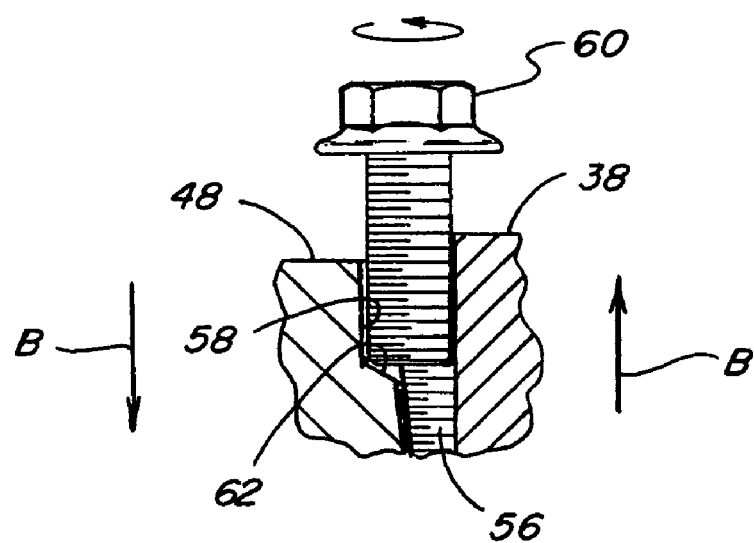
FIG. 6 is an enlarged fragmentary sectional view of the apparatus.
Figure 7:
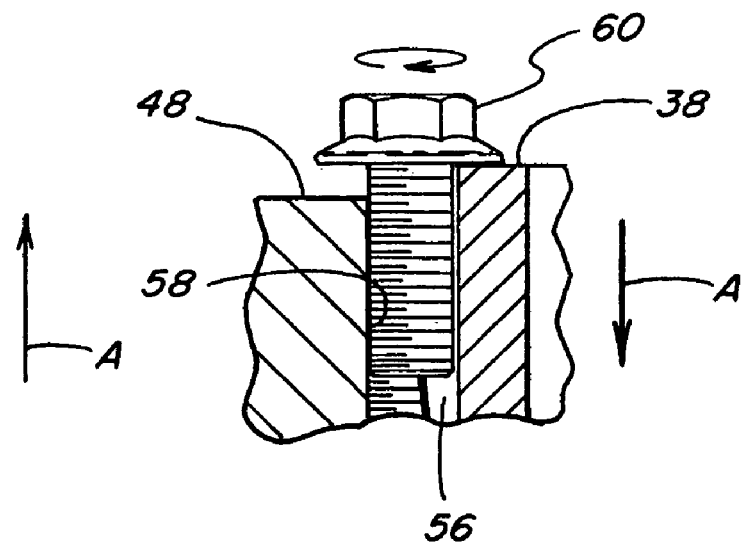
FIG. 7 is another enlarged fragmentary sectional view of the apparatus.

Referring also to FIGS. 6 and 7, aligned half-holes 56 and 58 and inner and outer hubs 38 and 48 at each spaced location, are configured and sized for cooperatively receiving threaded members 60, which here preferably comprise cap screws, but which can comprise other suitable threaded members, outer half-holes 58 at some of the spaced locations being threaded (FIG. 7) so as to be threadedly engageable with a threaded member 60 when received therein for pressing inner hub 38 and outer hub 48 together, as denoted by arrows A, while exerting a compressive force against inner hub 38 for compressing it around shaft 28. In this instance, the cap of the threaded member 60 will bear against an adjacent edge of inner hub 38 for pressing it into outer hub 48. And, when inner hub is compressed in this manner against shaft 28, locking hub will be held longitudinally on the shaft. Additionally, inner half-holes 56 at others of the spaced locations are threaded (FIG. 6) so as to be threadedly engageable with a threaded member 60 received therein, for jacking inner hub 38 and outer hub 48 apart, as denoted by opposing arrows B. Still further, outer half-holes 58 will have a predetermined depth, such that threaded elements 60 will bear against bottoms 62 of the half-holes for effecting the jacking movement.

Here, it should be observed that four of outer half-holes 58 are threaded, such that four threaded elements 60 can be utilized for pressing hubs 38 and 48 together. In contrast, two of inner half-holes 56, located at diametrically opposed locations around inner hub 38 are threaded, for jacking hubs 38 and 48 apart. However, it should be recognized that other numbers of threaded holes could be utilized in each instance, as desired or required for a particular application. It should also be observed that it is contemplated that threaded members 60 utilized in threaded outer half-holes 58, will typically remain in those holes during use of apparatus 22. Still further, it should be recognized that multi-sided inner surface 54 of outer hub 48 can comprise a size which will slip fit over shaft 28, for ease of assembly and disassembly of the locking hub.

As another feature of the invention, shaft 28 is provided with an optional transverse hole 64 therein at a predetermined longitudinal position therealong, which hole is configured and adapted for receiving a pin 66, which can be, for instance, a role pin or spring pin, usable for establishing a location for locking hub 22 longitudinally along shaft 28, and against which inner hub 38 can bear when jacked apart from outer hub 48. Pin 66 can also serve to help hold locking hub at a particular longitudinal location along the shaft, and can be removed to facilitate the disassembly of the apparatus.

It will be understood that changes in the details, materials, steps, and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention. Accordingly, the following claims are intended to protect the invention broadly as well as in the specific form shown.

What is claimed is:

1. A multi-sided shaft and locking hub apparatus, comprising:

a multi-sided shaft; and a locking hub, including an inner hub having a multi-sided inner surface extending around and defining a center hole through the inner hub configured and sized for receiving the multi-sided shaft with the sides of the inner surface in face-to-face abutting relation with the sides of the shaft, the inner hub including a tapered outer surface extending therearound, and a cut extending through the inner hub between the tapered outer surface and the multi-sided inner surface to allow compressing the inner hub, the locking hub including an outer hub having a tapered inner surface extending around and defining a central hole therethrough adapted for receiving the inner hub with the tapered inner surface and the tapered outer surface in face-to-face abutting relation, the tapered outer surface and the tapered inner surface including inner and outer half-holes at spaced locations therearound, respectively, the inner and outer half-holes at the spaced locations, respectively, being alignable when the inner hub is received in the center hole of the outer hub, for cooperatively receiving threaded members, the outer half-holes at some of the spaced locations being threaded so as to be threadedly engageable with the threaded members when received therein for pressing the inner hub and the outer hub together while exerting a compressive force against the inner hub, and the inner half-holes at others of the spaced locations being threaded so as to be threadedly engageable with the threaded members when received therein for jacking the inner hub and the outer hub apart, wherein the shaft includes a transverse passage therein at a predetermined longitudinal location therealong adjacent a distal end of the shaft, the transverse passage receiving a pin therein for bearing against the inner hub, for locating the hub longitudinally along the shaft, and against which the inner hub exerts a longitudinal force when the inner hub and the outer hub are jacked apart.

2. The apparatus of claim 1, wherein the outer hub includes a multi-sided inner surface defining an extension of the center hole therethrough configured and sized for receiving the multi-sided shaft with the sides of the inner surface of the outer hub in face-to-face relation with the sides of the shaft.

3. The apparatus of claim 1, wherein the locking hub comprises a portion of an overrunning clutch.

4. The apparatus of claim 3, wherein the overrunning clutch comprises at least one sheave.

5. The apparatus of claim 1, wherein the multi-sided shaft comprises a hexagonal shaft.

6. A multi-sided shaft and locking hub apparatus, comprising:
a multi-sided shaft; and
a locking hub, including an inner hub having a multi-sided inner surface extending around and defining a center hole through the inner hub configured and sized for receiving the multi-sided shaft with the sides of the inner surface in face-to-face abutting relation with the sides of the shaft, the inner hub including a tapered outer surface extending therearound, and a cut extending through the inner hub between the tapered outer surface and the multi-sided inner surface to enable compressing the inner hub, the locking hub including an outer hub having a tapered inner surface extending around and defining a central hole therethrough adapted for receiving the inner hub with the tapered inner surface and the tapered outer surface in face-to-face abutting relation, the outer hub including a multi-sided inner surface defining an extension of the center hole therethrough configured and sized for receiving the multi-sided shaft with the sides of the inner surface of the outer hub in face-to-face relation with the sides of the shaft, and the tapered outer surface and the tapered inner surface including inner and outer half-holes at spaced locations therearound, respectively, the inner and outer half-holes at the spaced locations, respectively, being alignable when the inner hub is received in the center hole of the outer hub, for cooperatively receiving threaded members, the outer half-holes at some of the spaced locations being threaded so as to be threadedly engageable with the threaded members when received therein for pressing the inner hub and the outer hub together while exerting a compressive force against the inner hub, and the inner half-holes at others of the spaced locations being threaded so as to be threadedly engageable with the threaded members when received therein for jacking the inner hub and the outer hub apart, wherein the shaft includes a transverse passage therein at a predetermined longitudinal location therealong adjacent a distal end of the shaft, the transverse passage receiving a pin therein for bearing against the inner hub, for locating the hub longitudinally along the shaft, and against which the inner hub exerts a longitudinal force when the inner hub and the outer hub are jacked apart.

7. The apparatus of claim 6, wherein the outer hub has portions associated with the outer half-holes at the others of the spaced locations, against which the threaded members will bear when jacking the inner hub and the outer hub apart.

8. The apparatus of claim 6, wherein the locking hub comprises a portion of an overrunning clutch.

9. The apparatus of claim 8, wherein the overrunning clutch comprises at least one sheave.

10. The apparatus of claim 8, wherein the multi-sided shaft comprises a hexagonal shaft.

11. A multi-sided shaft and locking hub apparatus, comprising:
a multi-sided shaft; and
a locking hub, including an inner hub having a multi-sided inner surface extending around and defining a center hole through the inner hub configured and sized for receiving the multi-sided shaft with the sides of the inner surface in non-relative rotating engagement with the sides of the shaft, the inner hub including a tapered outer surface extending therearound, and a cut in the inner hub to enable compression thereof, the locking hub including an outer hub having a tapered inner surface extending around and defining a central hole therethrough adapted for receiving the inner hub with the tapered inner surface and the tapered outer surface in face-to-face abutting relation, the outer hub including a multi-sided inner surface defining an extension of the center hole through the outer hub configured and sized for receiving the multi-sided shaft with the sides of the inner surface of the outer hub in non-relative rotating engagement with the sides of the shaft, and the tapered outer surface and the tapered inner surface including inner and outer half-holes at spaced locations therearound, respectively, the inner and outer half-holes at the spaced locations, respectively, being alignable when the inner hub is received in the center hole of the outer hub, for cooperatively receiving threaded members, the outer half-holes at some of the spaced locations being threaded so as to be threadedly engageable with the threaded members when received therein for pressing the inner hub and the outer hub together while exerting a compressive force against the inner hub, and the inner half-holes at others of the spaced locations being threaded so as to be threadedly engageable with the threaded members when received therein for jacking the inner hub and the outer hub apart, wherein the shaft includes a transverse passage therein at a predetermined longitudinal location therealong adjacent a distal end of the shaft, the transverse passage receiving a pin therein for bearing against the inner hub, for locating the hub longitudinally along the shaft, and against which the inner hub exerts a longitudinal force when the inner hub and the outer hub are jacked apart.

12. The apparatus of claim 11, wherein the outer hub has portions associated with the outer half-holes at the others of the spaced locations, against which the threaded members will bear when jacking the inner hub and the outer hub apart.

13. The apparatus of claim 11, wherein the locking hub comprises a portion of an overrunning clutch.

14. The apparatus of claim 13, wherein the overrunning clutch comprises at least one sheave.

15. The apparatus of claim 11, wherein the multi-sided shaft comprises a hexagonal shaft.

* * * * *